United States Patent
Tom et al.

(10) Patent No.: US 9,062,828 B2
(45) Date of Patent: Jun. 23, 2015

(54) LINER-BASED ASSEMBLY FOR REMOVING IMPURITIES

(75) Inventors: Glenn Tom, Bloomington, MN (US); Lawrence H. Dubois, Danbury, CT (US)

(73) Assignee: Advanced Technology Materials, Inc., Billerica, MA (US)

(*) Notice: Subject to any disclaimer, the term of this patent is extended or adjusted under 35 U.S.C. 154(b) by 0 days.

(21) Appl. No.: 13/881,757

(22) PCT Filed: Oct. 27, 2011

(86) PCT No.: PCT/US2011/058013
§ 371 (c)(1),
(2), (4) Date: Apr. 26, 2013

(87) PCT Pub. No.: WO2012/058384
PCT Pub. Date: May 3, 2012

(65) Prior Publication Data
US 2013/0213824 A1    Aug. 22, 2013

Related U.S. Application Data

(60) Provisional application No. 61/407,284, filed on Oct. 27, 2010, provisional application No. 61/468,626, filed on Mar. 29, 2011.

(51) Int. Cl.
*F17C 11/00* (2006.01)
*B65D 25/14* (2006.01)
(Continued)

(52) U.S. Cl.
CPC ........... *F17C 11/00* (2013.01); *Y10T 428/1359* (2015.01); *Y10T 428/1352* (2015.01);
(Continued)

(58) Field of Classification Search
CPC .............. B65D 77/065; B65D 77/062; B65D 77/06; B65D 90/046; B65D 90/04; F17C 1/10; F17C 1/16; F17C 3/12; F17C 2203/066; F17C 2203/0658; F17C 2203/06; F17C 2265/012; F17C 2265/01; F17C 11/00; B65D 25/14; B65D 81/24; B65D 85/84; B32B 1/02
USPC ............. 220/62.21, 62.11, 586, 581; 206/0.7, 206/0.6; 428/426, 34.7, 35.9, 35.7; 383/113, 112, 109
See application file for complete search history.

(56) References Cited

U.S. PATENT DOCUMENTS

| | | |
|---|---|---|
| 4,696,840 A | 9/1987 | McCullough et al. |
| 5,049,349 A | 9/1991 | McCullough et al. |

(Continued)

FOREIGN PATENT DOCUMENTS

| | | |
|---|---|---|
| CN | 101208255 A | 6/2008 |
| EP | 2148771 B1 | 2/2010 |

(Continued)

OTHER PUBLICATIONS

U.S. Appl. No. 61/468,832, filed Mar. 29, 2011, Dubois et al.
(Continued)

*Primary Examiner* — Robert J Hicks
(74) *Attorney, Agent, or Firm* — Christensen Fonder P.A.

(57) ABSTRACT

The present disclosure relates to a liner for storing a material, the liner including at least two layers, wherein a layer that is in contact with the material is an active layer. The active layer may be made active by incorporating a scavenger into the layer. At least one layer of the liner may comprise a polymer or a fluoropolymer. In some embodiments, the active layer may be configured for removing microbridging components in photoresists. In some embodiments, the active layer may be made active by coating the interior of the layer with an inert material, such as glass. In further embodiments, the liner may be positioned within a stainless steel canister. The present disclosure also relates to a liner-based assembly for storing a material, an overpack within which the liner is positioned, and a purifying packet positioned between the liner and the overpack.

14 Claims, 7 Drawing Sheets

(51) Int. Cl.
*B32B 1/02* (2006.01)
*B65D 81/24* (2006.01)
*B65D 85/84* (2006.01)

(52) U.S. Cl.
CPC .......... *Y10T428/1321* (2015.01); *B65D 25/14* (2013.01); *B65D 81/24* (2013.01); *B65D 85/84* (2013.01); *B32B 1/02* (2013.01)

(56) References Cited

U.S. PATENT DOCUMENTS

| | | | |
|---|---|---|---|
| 5,408,832 A * | 4/1995 | Boffito et al. | 62/45.1 |
| 5,570,815 A | 11/1996 | Ramsay | |
| 5,645,904 A * | 7/1997 | Woo et al. | 428/35.7 |
| 5,834,079 A * | 11/1998 | Blinka et al. | 428/35.7 |
| 5,840,422 A * | 11/1998 | Mueller et al. | 428/355 EN |
| 6,346,308 B1 * | 2/2002 | Cahill et al. | 428/35.7 |
| 6,708,502 B1 * | 3/2004 | Aceves et al. | 62/45.1 |
| 6,726,979 B2 * | 4/2004 | Friedman et al. | 428/141 |
| 6,817,485 B2 | 11/2004 | Kawai et al. | |
| 6,908,652 B1 | 6/2005 | Miranda et al. | |
| 7,204,950 B2 | 4/2007 | Farha et al. | |
| 7,335,721 B2 | 2/2008 | Alberg | |
| 8,313,821 B2 | 11/2012 | Yan et al. | |
| 2004/0086749 A1 | 5/2004 | Kennedy et al. | |
| 2004/0237488 A1 * | 12/2004 | Stenersen | 55/482 |
| 2005/0069475 A1 * | 3/2005 | Hage et al. | 423/210 |
| 2006/0037968 A1 | 2/2006 | Brenner | |
| 2008/0298727 A1 | 12/2008 | Edgington et al. | |
| 2009/0011263 A1 * | 1/2009 | Forloni | 428/483 |
| 2009/0212071 A1 | 8/2009 | Tom et al. | |
| 2009/0297769 A1 | 12/2009 | Yan et al. | |
| 2010/0112815 A1 | 5/2010 | O'Dougherty et al. | |
| 2011/0187028 A1 | 8/2011 | Menning et al. | |

FOREIGN PATENT DOCUMENTS

| | | |
|---|---|---|
| FR | 2902083 A1 | 12/2007 |
| WO | WO 2006/116389 A2 | 11/2006 |
| WO | 2009076101 | 6/2009 |
| WO | 2011006146 | 1/2011 |
| WO | 2011046802 | 4/2011 |
| WO | 2012051093 | 4/2012 |
| WO | 2012118527 | 9/2012 |

OTHER PUBLICATIONS

U.S. Appl. No. 61/501,925, filed Jun. 28, 2011, Chism et al.
U.S. Appl. No. 61/525,540, filed Aug. 19, 2011, Ware et al.
International Search Report and Written Opinion for related PCT Application PCT/US2011/058013 mailed Jun. 29, 2012 (7 pages).

* cited by examiner

LINER-BASED ASSEMBLY FOR REMOVING IMPURITIES

FIELD OF THE INVENTION

The present disclosure relates to liner-based assemblies. More particularly, the present disclosure relates to liner-based assemblies that either maintain or enhance the purity of the contents stored in the liner.

BACKGROUND OF THE INVENTION

Numerous manufacturing processes require the use of ultrapure liquids, such as acids, solvents, bases, photoresists, dopants, inorganic, organic, and biological solutions, pharmaceuticals, and radioactive chemicals. Such applications require that the number and size of particles in the ultrapure liquids be minimized. In particular, because ultrapure liquids are used in many aspects of the microelectronic manufacturing process, semiconductor manufacturers have established strict particle concentration specifications for process chemicals and chemical-handling equipment. Such specifications are needed because, should the liquids used during the manufacturing process contain high levels of particles or bubbles, the particles or bubbles may be deposited on solid surfaces of the silicon. This can, in turn, lead to product failure and reduced quality and reliability.

Accordingly, storage, transportation, and dispensing of such ultrapure liquids require containers capable of providing adequate protection for the retained liquids. Two types of containers typically used in the industries are simple rigid-wall containers made of glass or plastic and collapsible liner-based containers. Rigid-wall containers are conventionally used because of their physical strengths, thick walls, inexpensive cost, and ease of manufacture. Such containers, however, can introduce air-liquid interfaces when pressure-dispensing the liquid. This can cause gas to dissolve into the retained liquid, such as photoresist, in the container and can lead to undesired particle and bubble generation in the liquids in the dispense train.

Further, single-use plastic bags/liners may be used for storage, delivery, mixing, reacting, etc., for example, in the biopharmaceutical industry. The materials comprising the liner can negatively impact the contents of the liner in a number of ways, for example: leachable and extractable chemicals may move from the bag to the contents, resulting in contaminated material; the bag may dissolve into the contents causing structural weakening; chemical reactions between the contents of the bag and gases permeating through the bag (e.g., oxygen, water, ozone, etc.) may occur; surface adhesion may limit the amount of material delivered and/or induce unwanted reactions in the contents (e.g., biofouling), etc.

Accordingly, there exists a need for a better liner system that may not only maintain the purity of the contents of a liner, but may also enhance the purity of the contents of the liner.

BRIEF SUMMARY OF THE INVENTION

The present disclosure, in one embodiment, relates to a liner for storing a material, the liner including at least two layers, wherein a layer that is in contact with the material is an active layer. The active layer may be made active by incorporating a scavenger into the layer. At least one layer of the liner may comprise a polymer or a fluoropolymer. In some embodiments, the active layer may be configured for removing microbridging components in photoresists. In some embodiments, the active layer may be made active by coating the interior of the layer with an inert material, such as glass. In further embodiments, the liner may be positioned within a stainless steel canister.

The present disclosure, in another embodiment, relates to a liner for storing a material, the liner including at least two layers, wherein a layer that is not in contact with the material is an active layer. The active layer may be made active by incorporating a scavenger into the layer. At least one layer of the liner may comprise a polymer or a fluoropolymer.

The present disclosure, in still another embodiment, relates to a liner-based assembly including a liner for storing a material, an overpack within which the liner is positioned, and a purifying packet positioned between the liner and the overpack. The purifying packet may include a scavenger. The liner may include at least two layers, wherein at least one of the layers is an active layer.

The present disclosure, in another embodiment, relates to a liner-based assembly including a container for storing a hazardous gas, a liner within which the container is positioned, and a getter positioned between the container and the liner. The getter may include a permeable packaging containing a material capable of attracting or reacting with the gas stored in the container. The getter may also have a portion configured to change color when the material reacts with gas from the container, thereby indicating gas has leaked from the container. In some embodiments, the liner-based assembly may further include an outer container within which the liner and cylinder are positioned. A getter may be positioned between the outer container and the liner.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present disclosure relates to novel and advantageous liner-based assemblies. More particularly, the present disclosure relates to liner-based assemblies that may maintain and/or enhance the purity of the contents stored in the liner. In some embodiments, the flexible liner may be recycled and/or disposed of after use, thereby eliminating the need to clean the liner after use. Embodiments of the present disclosure may be used with a variety of fluids in a variety of different industries. Liners of the present disclosure may contain, for example, but are not limited to: liquids that are typically ultrapure liquids, such as acids, solvents, bases, photoresists, dopants, inorganic, organic, and biological solutions, pharmaceuticals, and radioactive chemicals, which can be very expensive, for example about $2,500/L or more; other products where maintaining the purity of the product is important, for example, food products, such as condiments; or any other material that may be suitably stored in a liner-based system.

Figure 1:
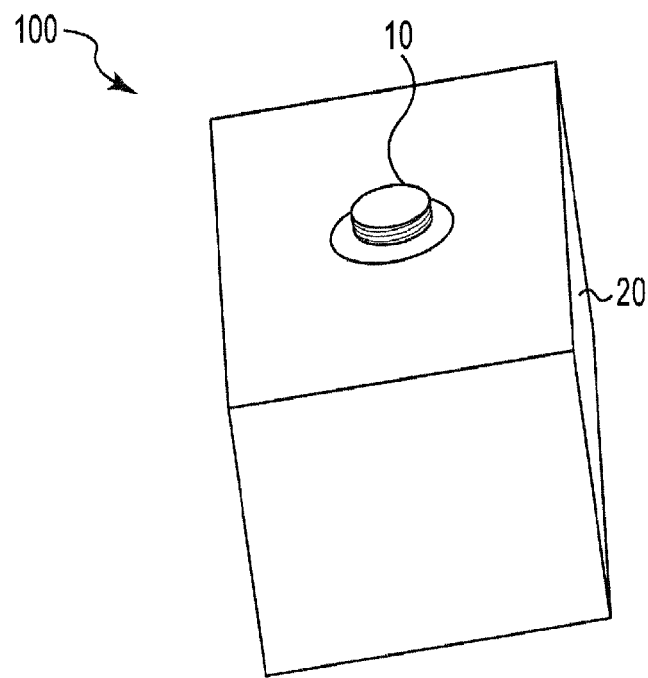
FIG. 1 shows a liner of the type that may be used in accordance with embodiments of the present disclosure.

FIG. 1 shows a liner 100 that may be used in a liner-based system to hold a desired material. The liner may have a fitment 10 for filling and dispensing a material and the liner 100 may also have one or more liner walls 20 depending on the shape of the liner. The liner may have any desired shape, such as a substantially cube-shape, a cylinder-shape, an octagonal-shape, a pillow shape, or any other geometry. In some embodiments, liner 100 may be manufactured using one or more polymers, including plastics, nylons, EVOH, polyolefins, or other natural or synthetic polymers. In further embodiments, liner 100 may be manufactured using polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and/or polypropylene (PP). Liners made using PEN, for example, may have lower permeability, and thus, allow less gas from outside the liner 100 to infiltrate the liner wall 20 and contaminate the material stored within the liner 100. Liners made using PE, LLDPE, LDPE, MDPE, HDPE, and/or PP may also be suitable for larger storage and dispensing systems, such as storage of about 2000 L or less of material.

In still alternative embodiments, liner 100 may be manufactured using a fluoropolymer, such as but not limited to, polychlorotrifluoroethylene (PCTFE), polytetrafluoroethylene (PTFE), fluorinated ethylene propylene (FEP), and perfluoroalkoxy (PFA). In some embodiments, liner 100 may comprise multiple layers. For example, in certain embodiments, liner 100 may include an internal surface layer, a core layer, and an outer layer, or any other suitable number of layers. The multiple layers may comprise one or more different polymers or other suitable materials. For example, the internal surface layer may be manufactured using a fluoropolymer (e.g., PCTFE, PTFE, FEP, PFA, etc.) and the core layer may be a gas barrier layer manufactured using such materials as nylon, EVOH, polyethylene naphthalate (PEN), PCTFE, etc. The outer layer may also be manufactured using any variety of suitable materials and may depend on the materials selected for the internal surface layer and core layer. It is recognized that the various embodiments of liners described herein may be manufactured from any suitable combination of materials disclosed herein. The liner 100 may be manufactured by any suitable means including, but not limited to, welding, or molding, including blow molding, extrusion blow molding, or any other method or combination of methods for forming a liner 100.

In some embodiments, the liner 100 may be a collapsible liner that may be flexible, while in other embodiments the liner 100 may be rigid, and in even further embodiments, the liner 100 may be somewhat rigid but still collapsible, i.e. a rigid collapsible liner. Examples of the type of liners that may be used in accordance with the present disclosure are disclosed in International PCT Patent Application No. PCT/US11/55558, titled "Substantially Rigid Collapsible Liner, Container and/or Liner for Replacing Glass Bottles, and Enhanced Flexible Liners," filed Oct. 10, 2011; U.S. Prov. Application No. 61/501,925, titled "Generally Cylindrically-Shaped Liner for Use in Pressure Dispense Systems and Methods of Manufacturing the Same," filed Jun. 28, 2011; U.S. Prov. Application No. 61/468,832, titled "Liner-Based Dispenser," filed Mar. 29, 2011; U.S. Prov. Application No. 61/525,540, titled "Liner-Based Dispensing Systems," filed Aug. 19, 2011; U.S. patent application Ser. No. 11/915,996, titled "Fluid Storage and Dispensing Systems and Processes," filed Jun. 5, 2006; International PCT Patent Application PCT/US11/55560, titled "Nested Blow Molded Liner and Overpack and Methods of Making Same," filed Oct. 10, 2011; International PCT Appl. No. PCT/US 10/51786, titled "Material Storage and Dispensing System and Method With Degassing Assembly," filed Oct. 7, 2010; International PCT Patent Application No. PCT/US 10/41629, titled "Substantially Rigid Collapsible Liner and Flexible Gusseted or Non-Gusseted Liners and Methods of Manufacturing the Same and Methods for Limiting Choke-Off in Liners," filed on Jul. 9, 2010; U.S. Pat. No. 7,335,721, titled "Polytetrafluoroethylene Treatement," issued Feb. 26, 2008; U.S. patent application Ser. No. 11/912,629, titled "Material Storage and Dispensing Packages and Methods," filed Dec. 23, 2008; U.S. patent application Ser. No. 12/302,287, titled "Barrier Fluoropolymer Film-Based Liners and Packaging Comprising Same," filed Jun. 24, 2009; and International PCT Patent Application No. PCT/US08/85264, titled "Blow Molded Liner for Overpack Container and Method of Manufacturing the Same," filed Dec. 2, 2008, each of which is hereby incorporated herein by reference in its entirety. Another example of the type of liner that may be used with embodiments of the present disclosure are liners used in or are compatible with the NOWpak® storage and dispensing systems by ATMI, Inc., such as that disclosed in U.S. patent application Ser. No. 11/915,996, titled "Fluid Storage and Dispensing Systems and Processes," which was filed Jun. 5, 2006, which is hereby incorporated herein by reference in its entirety.

In one embodiment of the present disclosure, a liner-based system may maintain and/or improve the utilization or purity of the contents within the liner. Typically, where the purity of the contents of a liner is important, a liner may be rated based upon the amount of impurities the liner may allow to be introduced into the contents. A liner may be designated as good, for example, if it only permits a very small amount of impurity to be introduced through the liner walls. For example, during transportation, impurities such as water, oxygen, and/or amines may contaminate the contents of the liner via diffusion. A liner according one embodiment, however, may improve the purity of the contents by actively removing impurities from the contents stored in the liner.

Figure 2A:
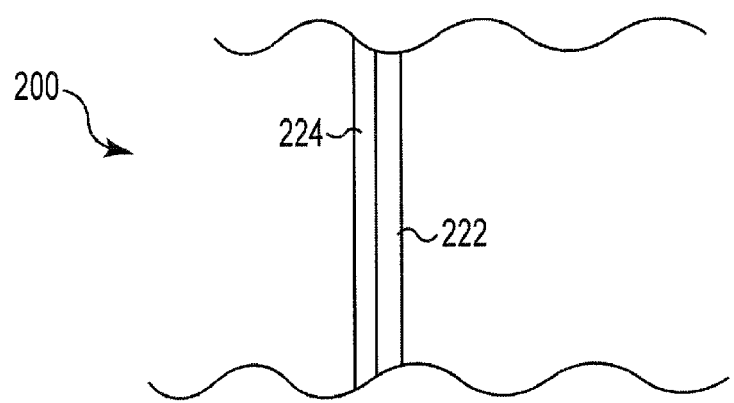
FIG. 2A shows an enlarged partial view of the layers of a liner in accordance with one embodiment of the present disclosure.

FIG. 2A shows a cut-away side view of a liner 200 with two layers—an inside layer 222 that comes in contact with the contents of the liner, and an active layer 224 that may trap critical impurities before the impurities may reach the stored contents. While FIG. 2A shows two layers, it will be appreciated that any number of layers may be used to form the liner wall, including more than two layers. Additionally, the active layer 224, in alternative embodiments with more than two layers, may be positioned at any layer relative to the inner layer. The active layer 224 may be made active by including a compound or material that may bind to, attract, and or trap a particular impurity or class of impurities in the desired layer of the liner. Examples of suitable compounds or materials that may be incorporated into a liner layer may include, but are not limited to: known desiccants for trapping moisture, such as silica gel, alumina, calcium sulfate, calcium chloride, montmorillonite clay, and/or molecular sieves, for example; substances that are easily oxidized for trapping oxygen, for example iron, sodium, or lithium; and/or a variety of suitable carbon-based compounds for trapping and/or removing unwanted organic elements. While the foregoing compounds and materials are provided as examples, it will be understood that any other suitable compound or material, or combination of compounds or materials may be included in a liner layer in order to attract and bind to undesirable impurities. Generally, the properties of the scavenger that may be incorporated into the active layer may include one or more of, but are not limited to: having a negligibly low vapor pressure; having a high capacity; having an ability to bind tightly to the impurities; being inert relative to the working fluid stored in the liner; being relatively low cost; being easily incorporated into the base material of the active layer; or being easy to handle during manufacturing, transporting, or filling.

Figure 2B:
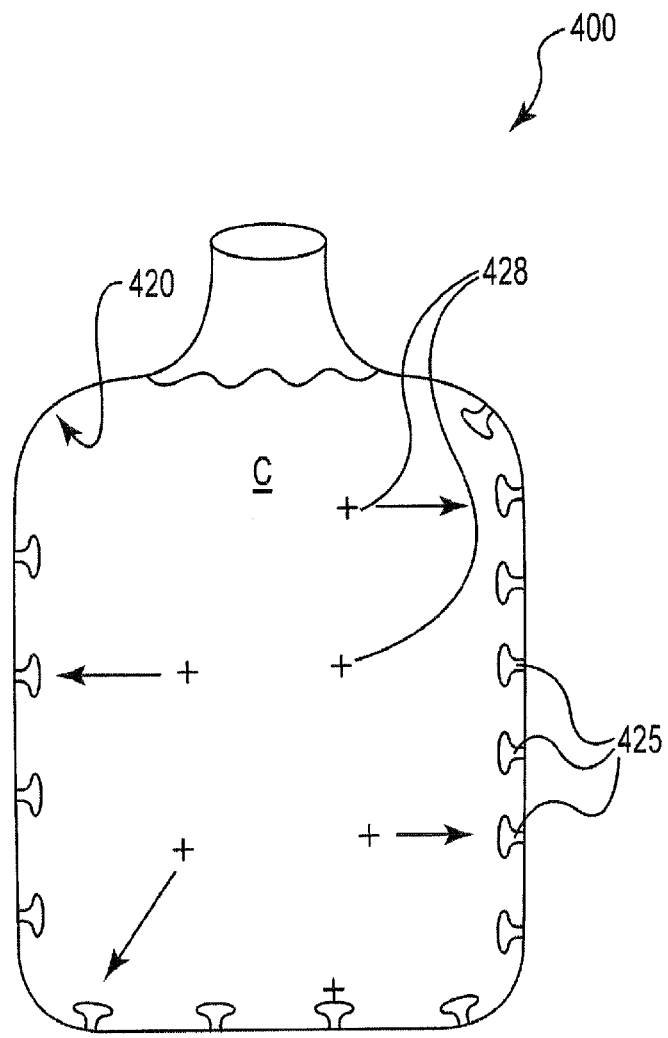
FIG. 2B shows a liner in accordance with one embodiment of the present disclosure.

In yet another embodiment, as shown in FIG. 2B, an interior surface 420 of the liner 400 may be made active, for example, to actively attract impurities 428 from the working contents C stored in the liner 400. The interior surface 420 of the liner 400 may be made active by, for example, covalently attaching receptors 425 (shown in large scale for illustrative purposes) to it. By covalently connecting the receptors 425, the receptors may interact with the contents of the liner, but the receptors 425 may not move from the interior surface 420 of the liner 400. For example, as described above, any suitable element, or compound may be incorporated into the liner layer that may attract and bind to a given impurity or set of impurities that may exist in the working fluid. In general, a receptor 425 may be chosen such that it has a high specificity for the target impurity 428 and a high binding constant, such that the receptor may only remove the impurity and not affect the working contents C. A high binding constant may be desirable, as typically the level of impurities in contents of the liner may already be necessarily low.

In one embodiment, for example, a crown ether of an appropriate cavity size may be covalently immobilized to absorb Na+ from the contents of the liner and bind it to the interior surface of the liner. In other embodiments, other chelating agents may be suitably used to remove various metals. In another embodiment, an active layer may be configured to remove microbridging components in photoresists, for example.

Figure 2C:
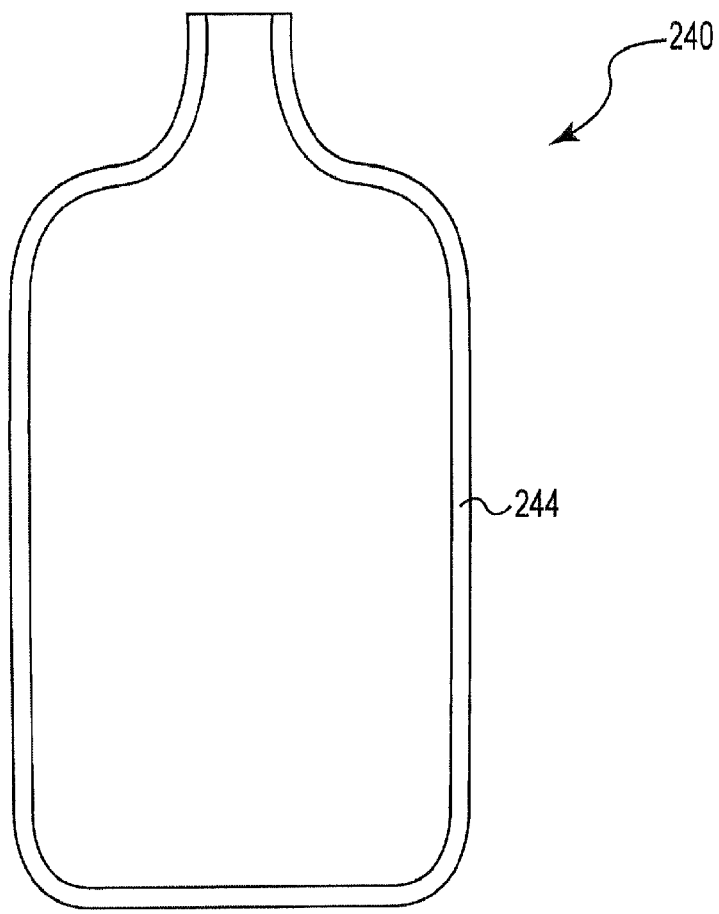
FIG. 2C shows a liner in accordance with another embodiment of the present disclosure.

In another embodiment, as shown in FIG. 2C, the interior surface of a liner 240 may be coated with an inert material, for example, but not limited to glass 244, such that the amount of impurities that may be introduced into or result from the liner 240 may be substantially zero. In this embodiment, a glass layer 244 may be deposited onto the interior surface of a liner 240 by, for example, vacuum techniques such as electron beam deposition, plasma discharge, vacuum evaporation, sputtering, and chemical plasma-enhanced chemical deposition techniques, such as liquid and/or gas followed by post-treatment, or any other suitable technique or combination of techniques. The glass coating 244 may be applied to any type of flexible liner regardless of what material the liner may be comprised. Further, the coating 244 may also be applied to the fitment of the liner, and other liner-based assembly elements, such as, but not limited to, connector tubing, valves, caps, etc. Other benefits of the glass coating may include one or more of the coating may generally be a non-porous gas barrier; may generally be optically transparent such that the contents of the liner may be seen; may withstand high temperature processing for sterilization; may be deposited either before or after liner fabrication, allow for flexibility in the manufacturing process; may be non-brittle; have good adhesion; may be easily recycled; and/or may be relatively low cost. The glass coating may comprise a silica-based material, or other suitable materials, or combination of materials, for example, but not limited to, alumina, silica-alumina, etc.

Figure 3A:
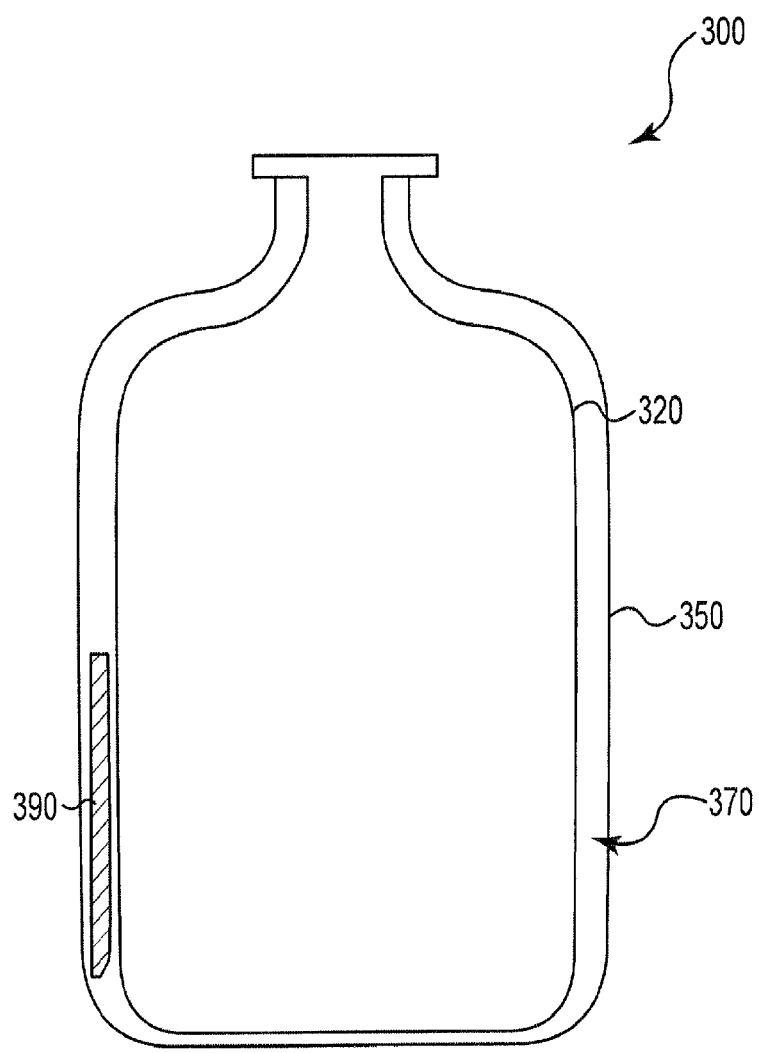
FIG. 3A shows a liner-based system in accordance with one embodiment of the present disclosure.

In another embodiment, illustrated as 300 in FIG. 3A, a liner 320 may be used in conjunction with an overpack 350, as will be understood by those skilled in the art. In the space 370 between the liner 320 and the overpack 350, a purifying packet 390 may be placed. The purifying packet 390 may take any appropriate shape and may have any appropriate size. A purifying packet 390 in one embodiment can perforin substantially the same function as an active layer described above, i.e. the purifying packet 390 traps impurities before the impurities enter the interior of the liner 320 that stores the working contents. The purifying packet 390 may comprise, but is not limited to similar scavengers as were described above relating to embodiments including an active layer.

Figure 3B:
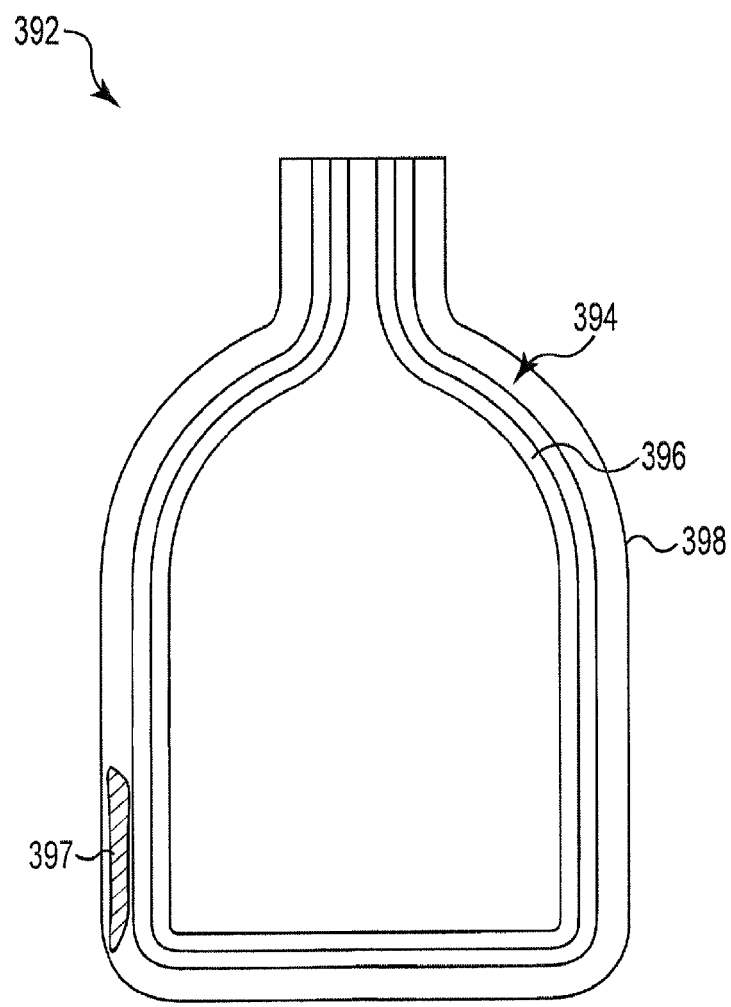
FIG. 3B shows a liner-based system in accordance with another embodiment of the present disclosure.

In another embodiment, as shown in FIG. 3B, a liner-based system 392 may include a liner 394, an overpack 398, and a purifying packet 397 that may be positioned between the liner 394 and the overpack 398, as described with reference to FIG. 3A. But the liner 394 may also comprise an active layer 396 as described above. The active layer may be any desired layer of the liner.

Figure 4:
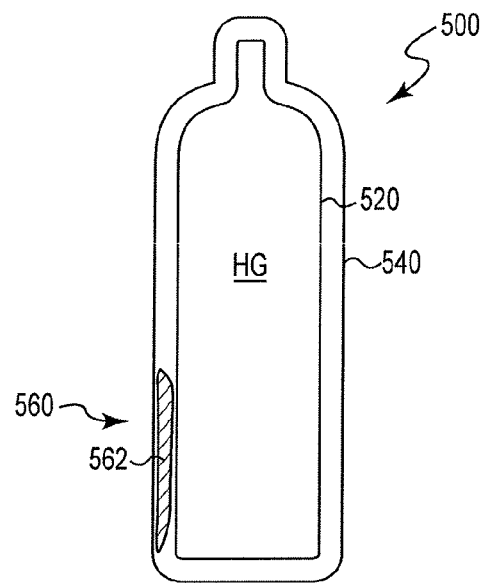
FIG. 4 shows a liner-based assembly in accordance with one embodiment of the present disclosure.
Figure 5:
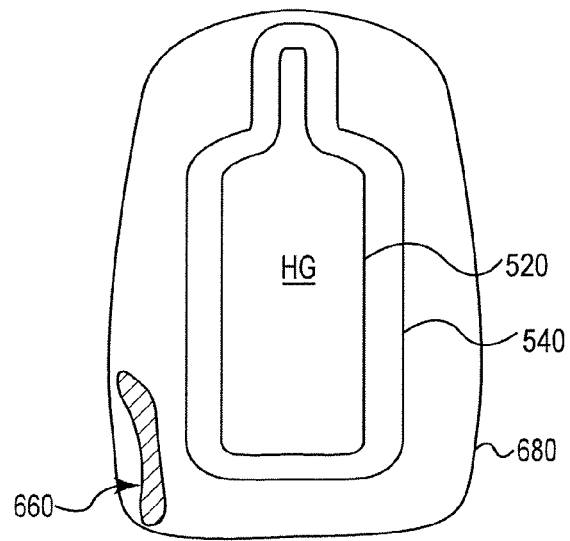
FIG. 5 shows a liner-based assembly in accordance with another embodiment of the present disclosure.

Another embodiment of the present disclosure, as shown in FIGS. 4 and 5, may be a liner-based assembly that generally provides for relatively safer storage and/or delivery of hazardous gases, for example, arsine and phosphine. For example, when a gas is stored in a cylinder, or other container, the gas may leak out of the container for a variety of largely unintended reasons. Embodiments are disclosed herein for reducing, minimizing, or substantially eliminating the threat posed by a hazardous gas that has leaked from a container and/or a liner. As may be seen in FIG. 4, a liner-based system 500 according to one embodiment may comprise a container that may be a cylinder 520 that may store a hazardous gas HG, for example. The cylinder 520 may be enclosed within a barrier bag or liner 540. The system may also include a getter 560 that may be placed between the cylinder 520 and the barrier bag 540. The getter 560 may comprise a permeable packaging containing a material 562, such as a scrubber, that is capable of attracting and reacting with the toxic gas that is contained in the cylinder, in the event of a leak. Examples of such scrubber materials may include, but are not limited to an activated alumina compound impregnated with materials to handle specific gases such as hydrogen sulfide, and/or one or more of the following: methyl mercaptans; aldehydes; volatile organic compounds; dimethyl sulfide; dimethyl disulfide; and/or alkaline materials. In some embodiments, the getter package can be sized so as to accommodate the amount of gas that may be leaked, although any suitable size is contemplated. In some embodiments, the getter may also be selected or configured such that the package may completely, or partially, change color to indicate when the getter material reacts with a hazardous gas. In this way, the getter may also serve as a warning that the hazardous gas has leaked.

In another embodiment, as shown in FIG. 5, the system as shown, for example, in FIG. 4 may further include an outer container 680 that may be more robust than the barrier bag 540. For example, the outer container 680 may be a cardboard box, or a container of any other suitable material such as wood, metal, or combination of materials. In this embodiment, the getter 660 may be positioned in the space between the exterior wall of the barrier bag 640 and the interior wall of the outer container 680. In still another embodiment, a getter may be placed between the cylinder and the liner as shown in FIG. 4 and another getter may be placed between the liner and the outer container as shown in FIG. 5.

In another embodiment of the present disclosure, the liner-based system may include a metal overpack. In one embodiment, the overpack may be comprised of stainless steel. While embodiments are described with reference to a stainless steel overpack, it will be recognized that the overpack may be comprised of other metals or metal alloys, or of a combination of metals or alloys, in other embodiments. Stainless steel may be used to store and dispense materials that are and must remain substantially ultrapure, for example. Additionally, stainless steel canisters may be used to store and dispense hazardous and/or extremely hazardous materials, materials that may be air and moisture sensitive, and/or materials that are pyrophoric and/or flammable. Typical stainless steel canisters are used to store the desired contents directly in and dispense the desired contents directly from the canister. After the contents of the canister have been dispensed, the canister may generally need to be thoroughly cleaned and/or sterilized prior to reuse.

Figure 6:
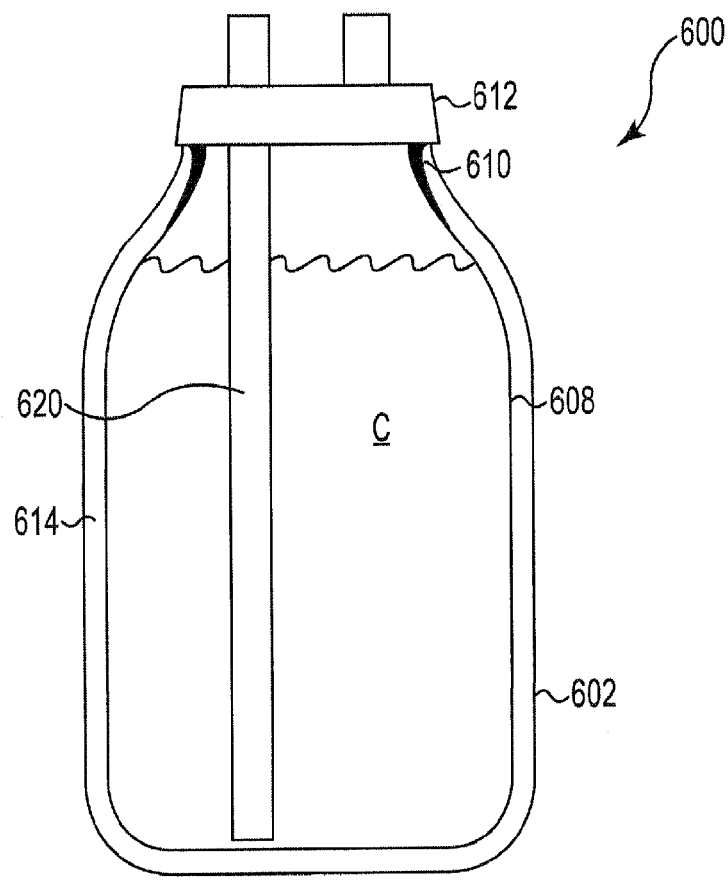
FIG. 6 shows a cross-sectional view of a liner-based assembly in accordance with another embodiment of the present disclosure.

In one embodiment of the present disclosure, as shown in FIG. 6, a liner-based system may include a stainless steel overpack 602 and a liner 608 positioned inside of the overpack 602. As may be seen, the desired contents C may be stored in the liner 608 and may not come into contact with the overpack 602. The liner-based system 600 may advantageously be used with traditional stainless steel filling and/or dispensing systems, but may also provide the additional benefit of including a disposable liner 608 inside of the overpack 602. As such, the liner may provide additional protection for the contents C of the material stored therein. For example, the liner 608 may help ensure, maintain and/or enhance the purity of the contents stored in the liner, in some embodiments. Additionally, the liner 608 may help prevent or reduce the risk of hazardous contents escaping from the liner-based system 600. Further, because the overpack 602 does not generally come into contact with the contents C of the liner 608, the overpack 602 may have an extended lifetime of use.

The liner 608, in some embodiments, may be any suitable liner, including but not limited to rigid collapsible and/or flexible liners, for example, or any other liner referenced herein. Additionally, liners of the liner-based system 600 may include any of the other properties disclosed herein. In some embodiments, the liner may be configured to fit with existing canister systems, including for example, stainless steel canister systems.

In one embodiment, the liner 608 may be thicker at the top collar 610 of the liner, thereby allowing the collar 610 of the liner to form a seal between a connector 612 or cap of the overpack and the overpack 602 itself. In use, the annular space 614 between the liner 608 and the overpack 602 may be pressurized, for example with an acceptable amount of a gas, for example nitrogen, or any other suitable gas. The blanket of nitrogen, for example, in the annular space may substantially prevent oxygen or moisture from diffusing through the liner 608 walls into the interior of the liner 608.

The contents of the liner may be dispensed by pressure dispense (direct or indirect), pressure-assisted pump dispense, or by pump dispense. Generally, existing canisters made of steel that are used in the industry without a liner, require that the contents of the canister by dispensed either by pump dispense or by direct pressure dispense. Direct pressure dispense involves introducing a gas source directly into the canister, thereby putting pressure on the contents of the liner, which may then cause the contents of the liner to move into a dip tube 620 and out of the canister. One of the advantages permitted by some embodiments of the present disclosure includes that the contents C of the liner 608 may be dispensed by indirect pressure dispense. Accordingly, a gas or fluid may be introduced into the annular space 614, thereby collapsing the liner 608 and forcing the contents C of the liner out of the liner 608. Dispensing via indirect pressure dispense may be advantageous over direct pressure dispense because direct pressure dispense inherently involves the risk of contaminating the contents of the liner with the gas that is introduced into the liner and/or creating bubbles in the contents of the liner. Nonetheless, embodiments of the present disclosure may also be dispensed via direct pressure dispense.

In the foregoing description various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

We claim:

1. A liner-based assembly comprising:
a collapsible liner for storing a material, the collapsible liner including at least two layers,
wherein at least one of the layers is an active layer;
an overpack within which the collapsible liner is positioned; and
a purifying packet positioned between the collapsible liner and the overpack,
wherein the active layer is configured for removing micro-bridging components in photoresists.

2. The liner-based assembly of claim 1, wherein the active layer is made active by incorporating a scavenger into the layer.

3. The liner-based assembly of claim 2, wherein at least one layer of the flexible liner comprises a polymer.

4. The liner-based assembly of claim 2, wherein at least one layer of the flexible liner comprises a fluoropolymer.

5. The liner-based assembly of claim 1, wherein the active layer is made active by coating the interior of the layer with an inert material.

6. The liner-based assembly of claim 5, wherein the inert material comprises glass.

7. The liner-based assembly of claim 1, wherein the overpack is a stainless steel canister.

8. The liner-based assembly of claim 1, wherein the purifying packet comprises a scavenger.

9. A liner-based assembly comprising:
a container for storing a hazardous gas;
a barrier bag within which the container is positioned; and
a getter positioned between the container and the barrier bag.

10. The liner-based assembly of claim 9, wherein the getter comprises a permeable packaging containing a material capable of attracting or reacting with a hazardous gas stored in the container.

11. The liner-based assembly of claim 10, wherein the getter comprises a portion configured to change color when the material reacts with the hazardous gas from the container, thereby indicating gas has leaked from the container.

12. The liner-based assembly of claim 10, further comprising a second outer container within which the barrier bag and the container within the barrier bag are positioned.

13. The liner-based assembly of claim 12, further comprising a getter positioned between the outer container and the barrier bag.

14. The liner-based assembly of claim 1, wherein the collapsible liner is a flexible liner.

* * * * *